Oct. 22, 1968  J. H. ATKINS ET AL  3,406,842
AUTOMATIC FEED APPARATUS FOR BOOK SEWING MACHINE
Original Filed Jan. 31, 1964  12 Sheets-Sheet 8

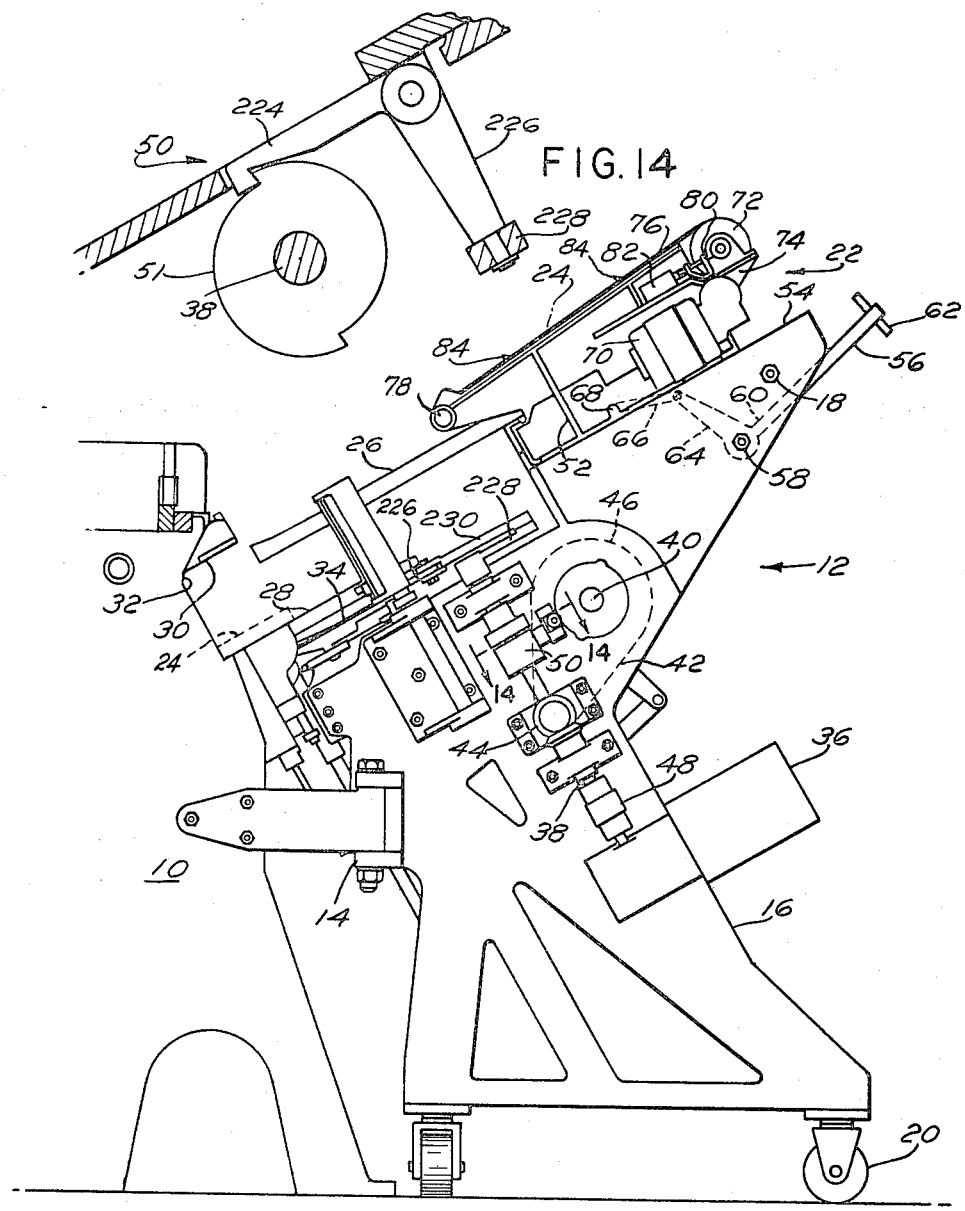

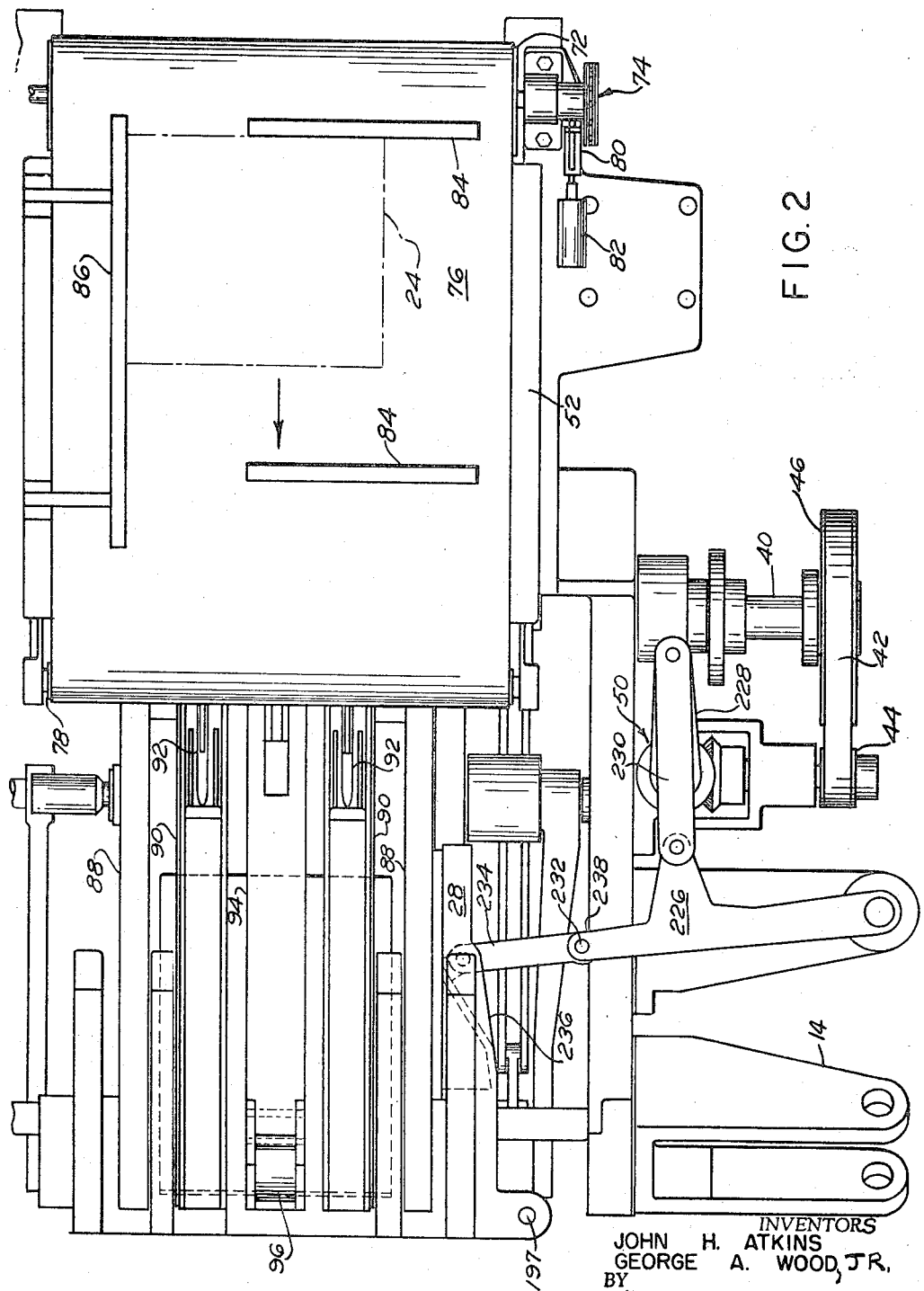

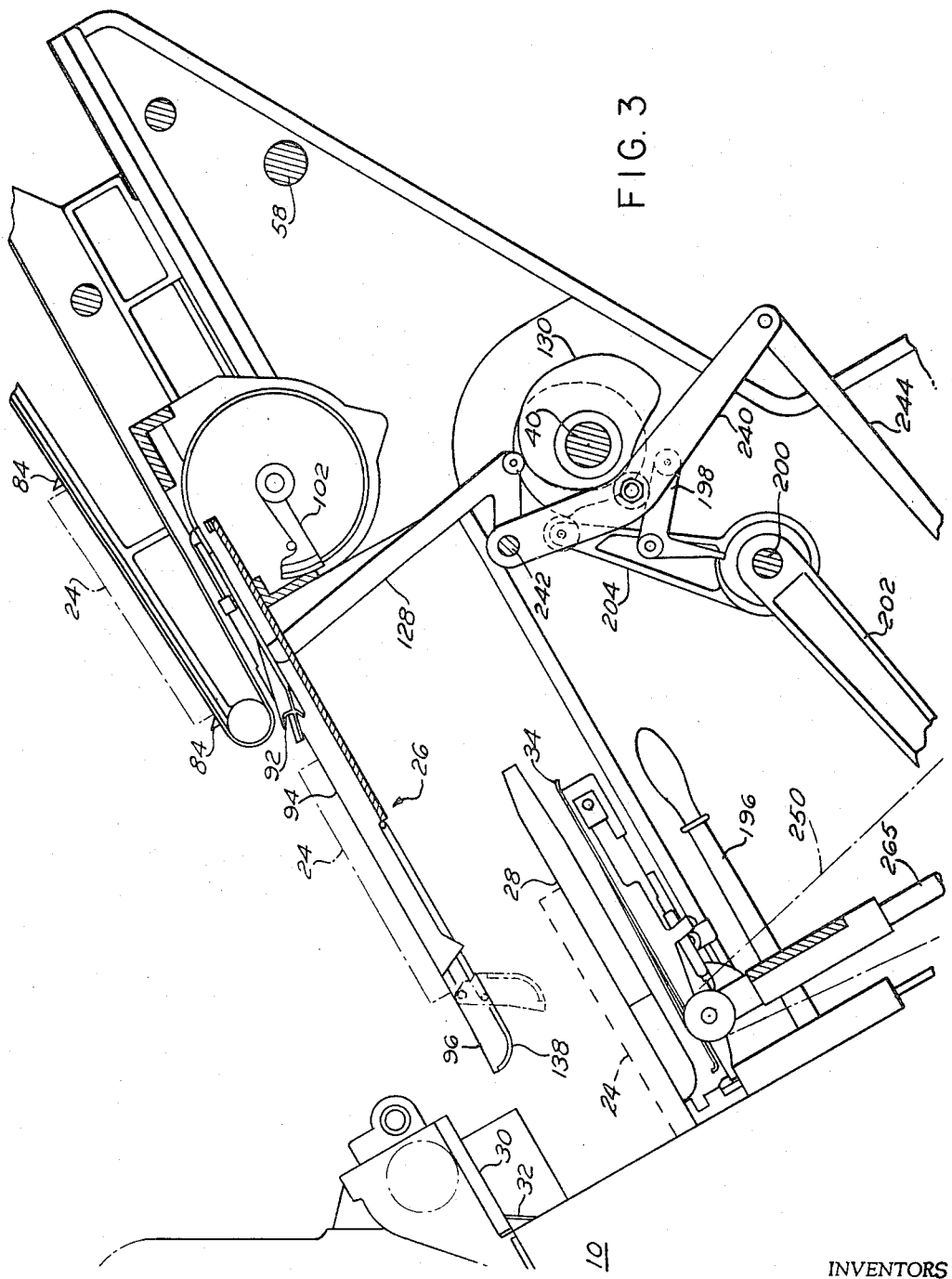

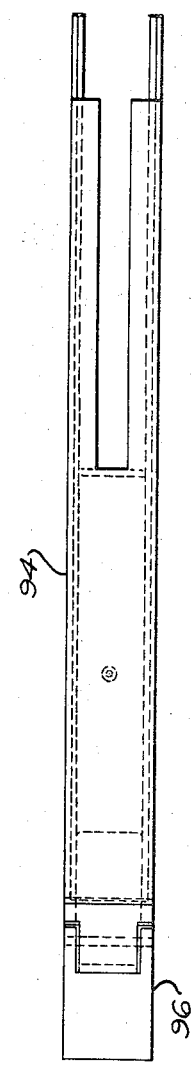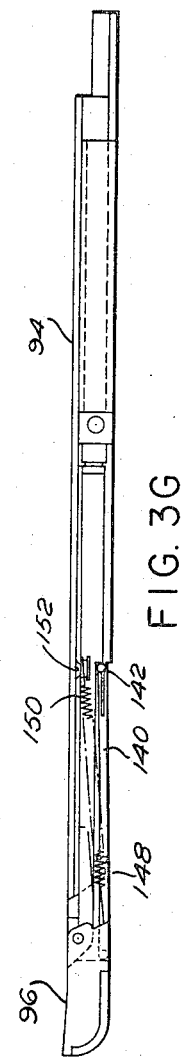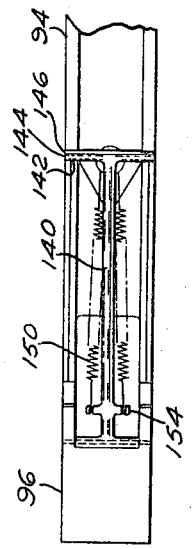

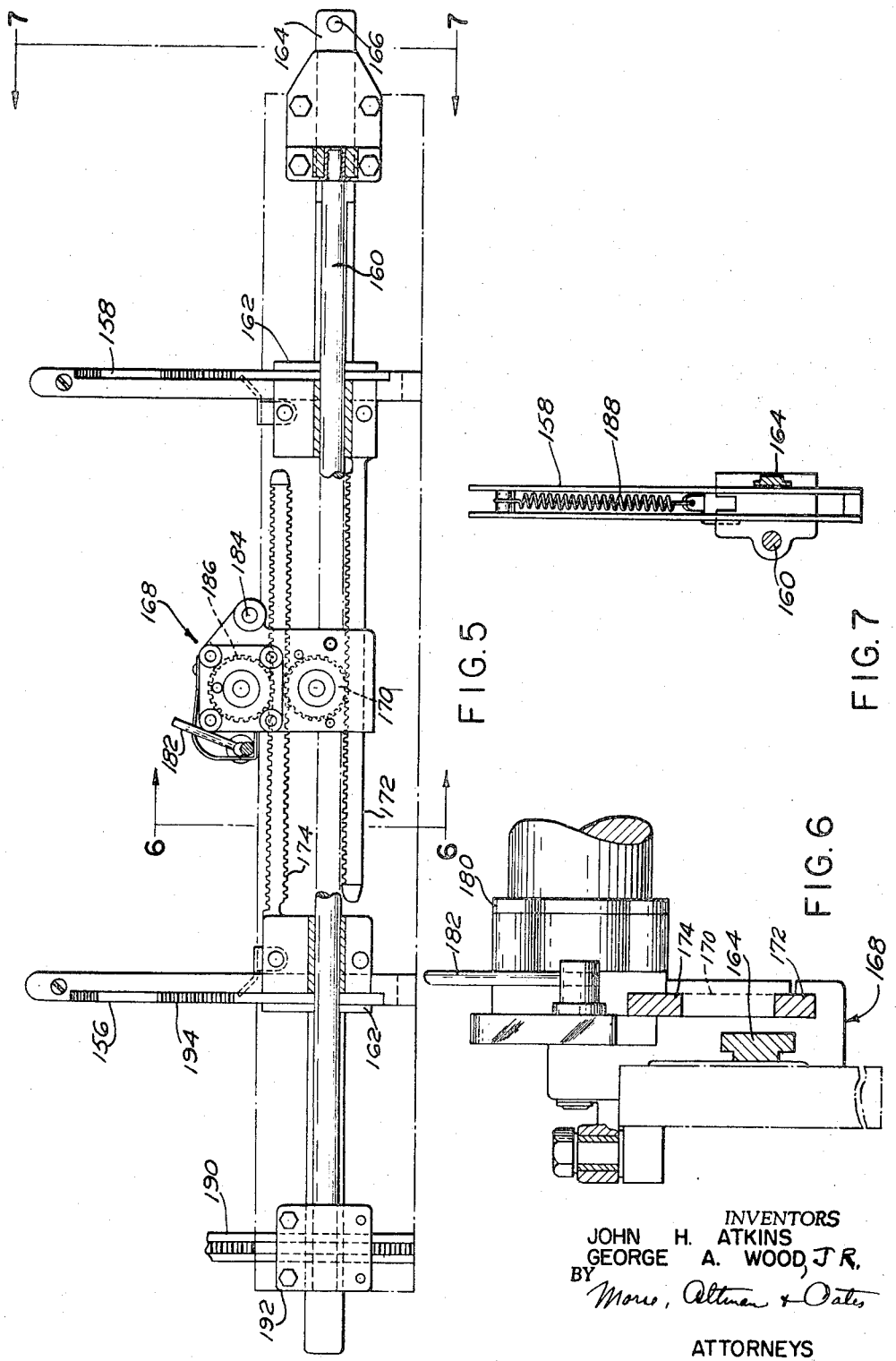

INVENTORS
JOHN H. ATKINS
GEORGE A. WOOD, JR.
BY
Monro, Altman & Oates
ATTORNEYS

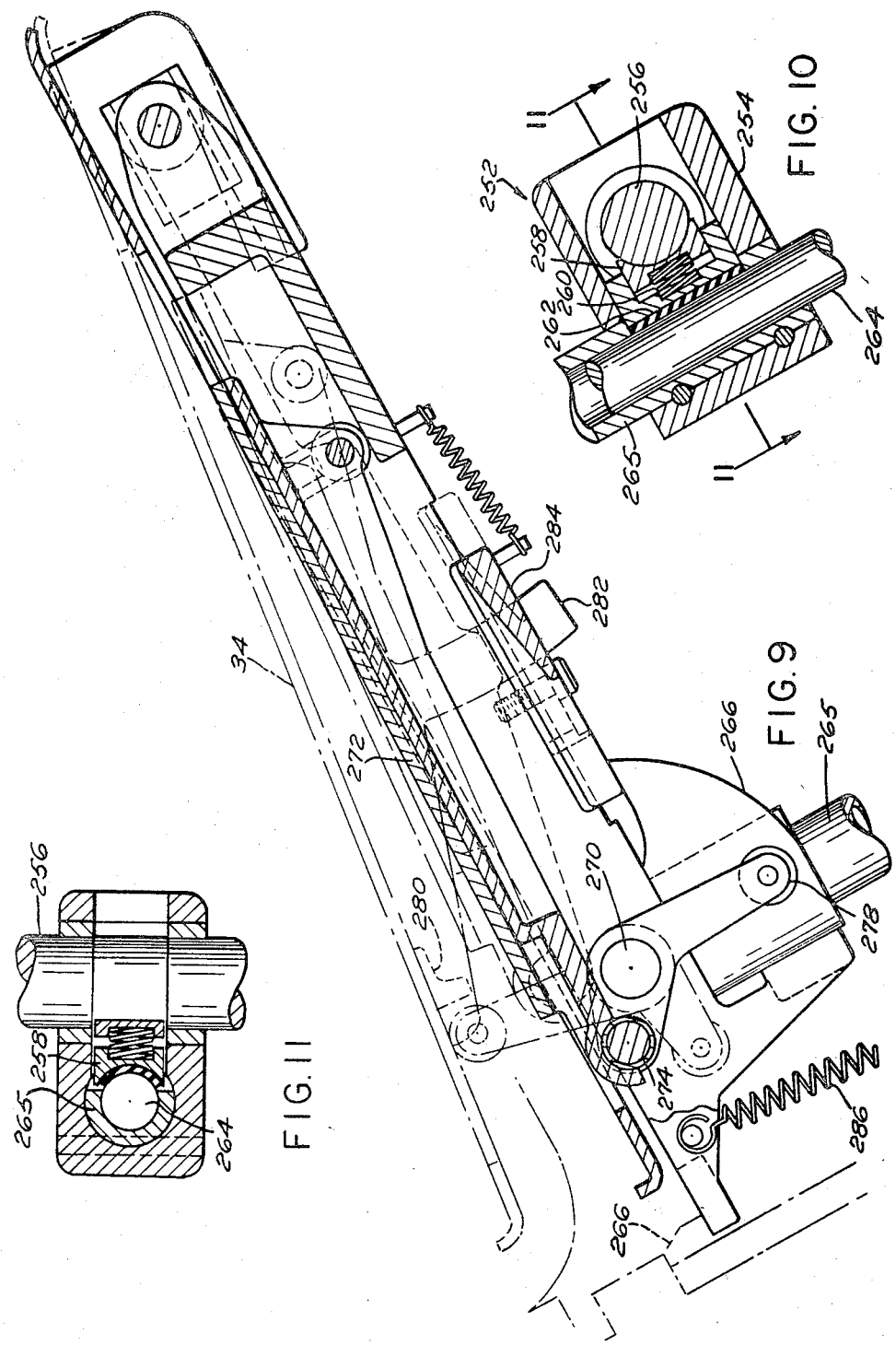

Oct. 22, 1968    J. H. ATKINS ET AL    3,406,842
AUTOMATIC FEED APPARATUS FOR BOOK SEWING MACHINE
Original Filed Jan. 31, 1964    12 Sheets-Sheet 11

INVENTORS
JOHN H. ATKINS
GEORGE A. WOOD, JR.
BY
Morse, Altman & Oates
ATTORNEYS

2

3,406,842
AUTOMATIC FEED APPARATUS FOR BOOK SEWING MACHINE

John H. Atkins, Lexington, and George A. Wood, Jr., Lincoln, Mass., assignors, by direct and mesne assignments, to Oversewing Machine Company of America, Medford, Mass., a corporation of Massachusetts
Original application Jan. 31, 1964, Ser. No. 341,501, now Patent No. 3,272,160, dated Sept. 13, 1966. Divided and this application July 8, 1966, Ser. No. 563,759
7 Claims. (Cl. 214—6)

ABSTRACT OF THE DISCLOSURE

An apparatus is provided for feeding signatures automatically into a book sewing machine. A conveyor delivers the signatures onto a shelf. Each time a new signature is added to the stack of signatures, oscillating racks center the signature and the stack on the shelf, the shelf is raised up into sewing position and the topmost signature is sewn to the underlying volume. The stack is also shifted laterally after each sewing operation to stagger the stitching. As the signatures accumulate, the shelf and book drop down until all of the signatures are sewn. Thereafter the shelf, which has been supporting the book during the sewing operation, swings out of the way allowing the volume to drop onto a table. The shelf has an inner knife edge which, when it swings closed, automatically cuts the threads connecting the needle to the book. The book is then dumped by the table out of the machine.

---

Figure 4:
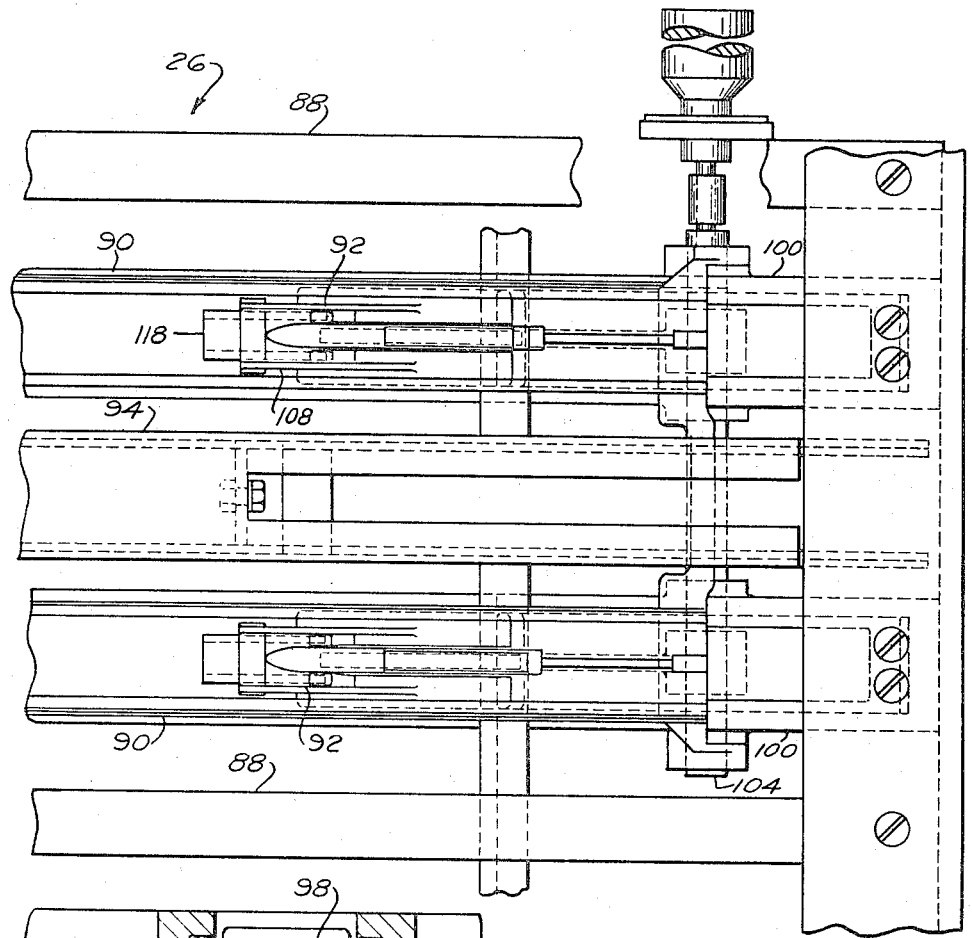

This invention relates generally to machines for sewing books and more particularly is directed towards an apparatus for automatically feed and positioning book signatures to an oversewing machine, centering the signatures for the sewing operations and subsequently cutting the attached threads and dumping the finished volume.

This application is a division of U.S. patent application Ser. No. 341,501, filed Jan. 31, 1964, now Patent No. 3,272,160, for Automatic Feed Apparatus for Booksewing Machine.

An oversewn book is one in which two or more book sections or signatures are joined by sewing through and over the edges of the adjacent signatures to secure a tight hold upon each leaf of the book by means of multiple stitches passing through the stronger portion of the paper which has not been weakened by folding. In a standard oversewing machine, signatures are fed in one at a time with the first signature starting a new book being double sewn and the succeeding sections are added one at a time receiving each a number of stitches with the final section, like the first, being also double sewn. As each section reaches the sewing mechanism, it is attached securely to the preceding section and to the following sections because each set of stitches penetrates three or more sections at a time making the entire group of sections which constitute the complete book a securely united volume.

Heretofore, oversewing machines have included a number of manual steps which require a rather high degree of operating skill to produce books of a uniform quality. For example, the individual signatures must be fed by hand and positioned properly at the sewing station. Unless the signatures are properly centered and positioned laterally, the particular signature will not be bound properly to the book and the finished volume will have an irregular appearance.

The various parts of the machine and their control require constant attention and considerable skill on the part of the operator. Because of the repetitious nature of the work and the various manual operations involved, the task of oversewing books in large numbers is rather tiring and, without skilled help, the resulting products might not be of uniform quality.

Accordingly, it is an object of the present invention to provide improvements in oversewing machines.

Another object of this invention is to provide an attachment for oversewing machines which attachment will carry signatures automatically into the machine and perform automatically operations previously done manually.

Still another object of this invention is to provide an oversewing machine attachment which requires a minimum amount of training, skill and attention on the part of the operator.

Yet another object of this invention is to provide an oversewing machine attachment which will feed, position, build up successive signatures, drop the finished book, cut the attached threads and finally dump the sewn volume, all automatically.

More particularly, this invention features an attachment for oversewing machines which attachment may be readily adapted to conventional machines and which may be conveniently swung in and out of operating position for servicing both the machine and the attachment.

In particular, the attachment features a conveyor system for feeding, one by one, signatures placed thereon down onto a ready shelf from which, at the proper moment, they are pushed into the sewing station on top of previously sewn signatures. In the sewing station an automatic centering apparatus positions the deposited signatures precisely with respect to the sewn portion of the volume and also indexes the volume laterally to one side or the other so as to stagger the stitching. As the signatures accumulate, the book drops down gradually until all of the signatures are sewn. Thereupon, a bookshelf, which has been supporting the book during the sewing operation, swings out of the way allowing the sewn volume to drop onto a table. The shelf, which has an inner knife edge, then moves upward and swings shut, thereby automatically cutting the threads connecting the needles to the book. Finally, the table itself is provided with a hinged portion which swings down to dump the book out onto a suitable receiver such as a conveyor or the like.

Figure 3A:
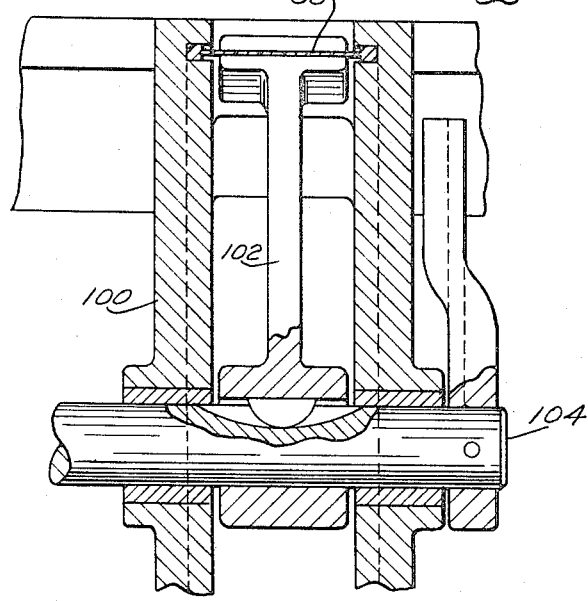
Figure 3E:
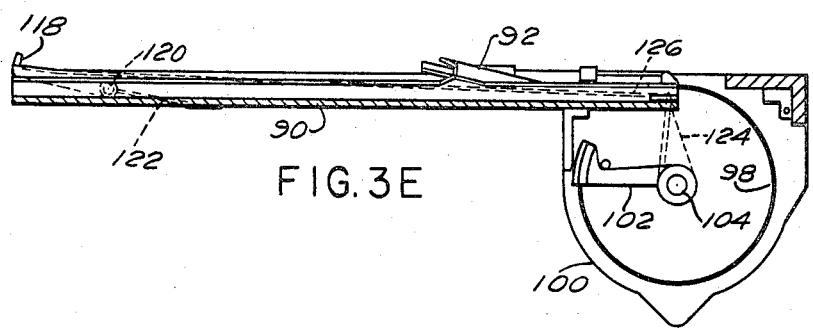
Figure 3C:
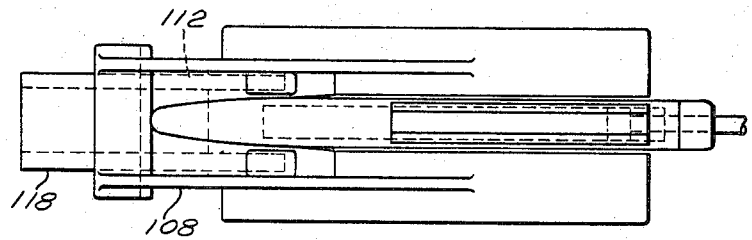
Figure 3B:
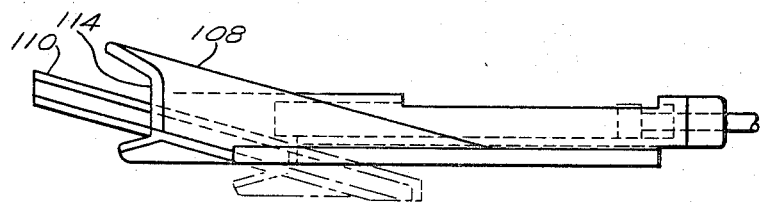
Figure 3D:
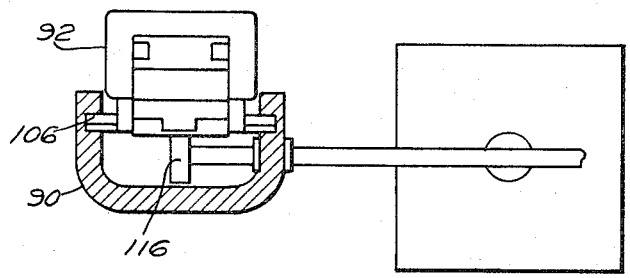
Figure 5A:
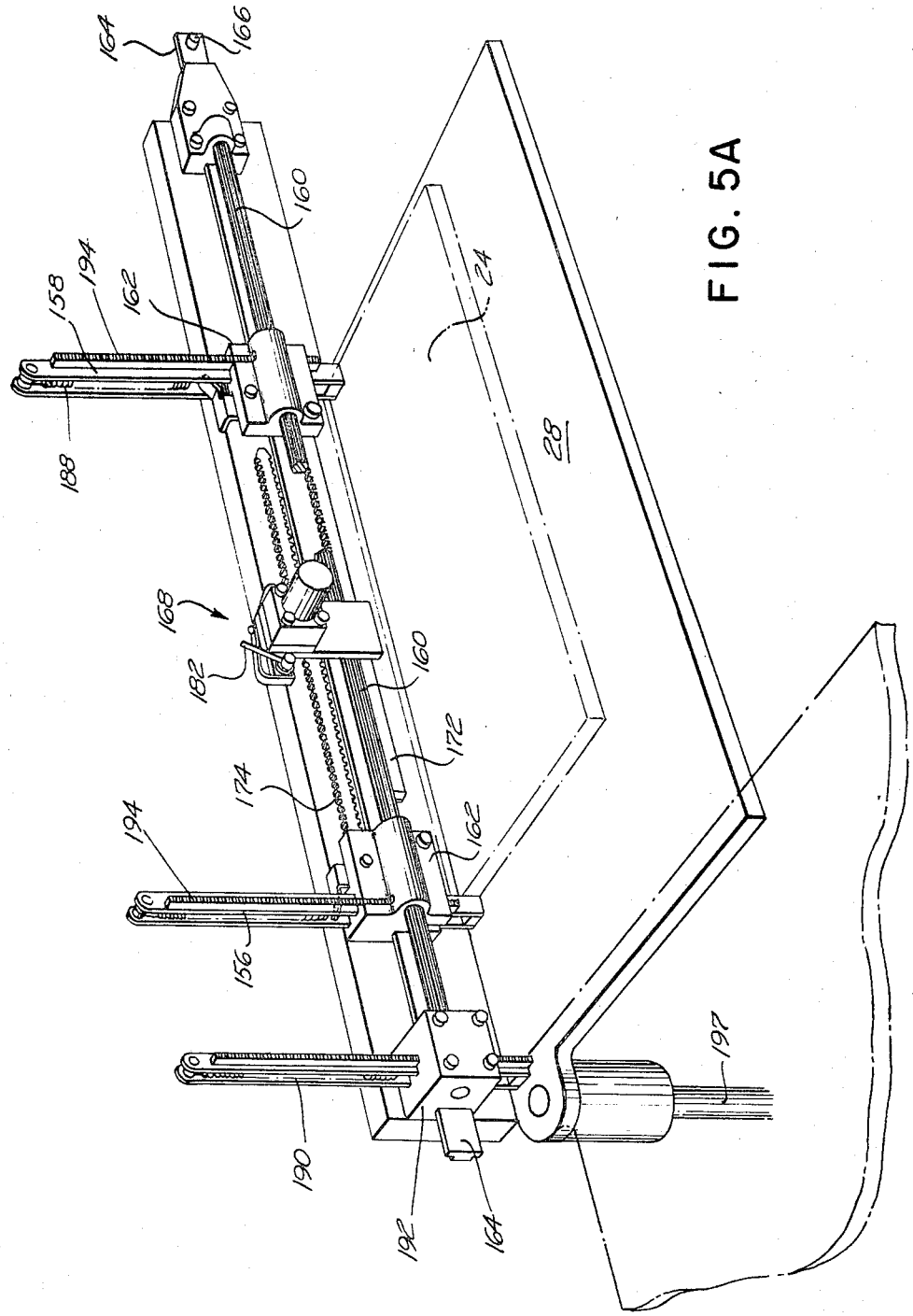

But these and other features of the invention, along with further objects and advantages thereof, will become more fully apparent from the following detailed description of the invention, with reference being made to the accompanying drawings, in which:

FIG. 1 is a view in side elevation of an oversewing machine attachment made according to the invention, FIG. 2 is a top plan view thereof, FIG. 3 is a detail sectional view in side elevation, FIG. 3a is a detail section in front elevation showing the pusher drive mechanism, FIG. 3b is a side elevation of the pusher assembly, FIG. 3c is a top plan view thereof, FIG. 3d is a front elevation thereof partly in section, FIG. 3e is a view in side elevation partly in section showing the pusher conveyor assembly, FIG. 3f is a top plan view of the finger push assembly, FIG. 3g is a view in side elevation thereof, FIG. 3h is a fragmentary top sectional view thereof, FIG. 4 is a fragmentary top plan view of the signature shelf, FIG. 5 is a view in front elevation of the signature centering mechanism, FIG. 5a is a perspective view of the FIG. 5 mechanism.

Figure 8:
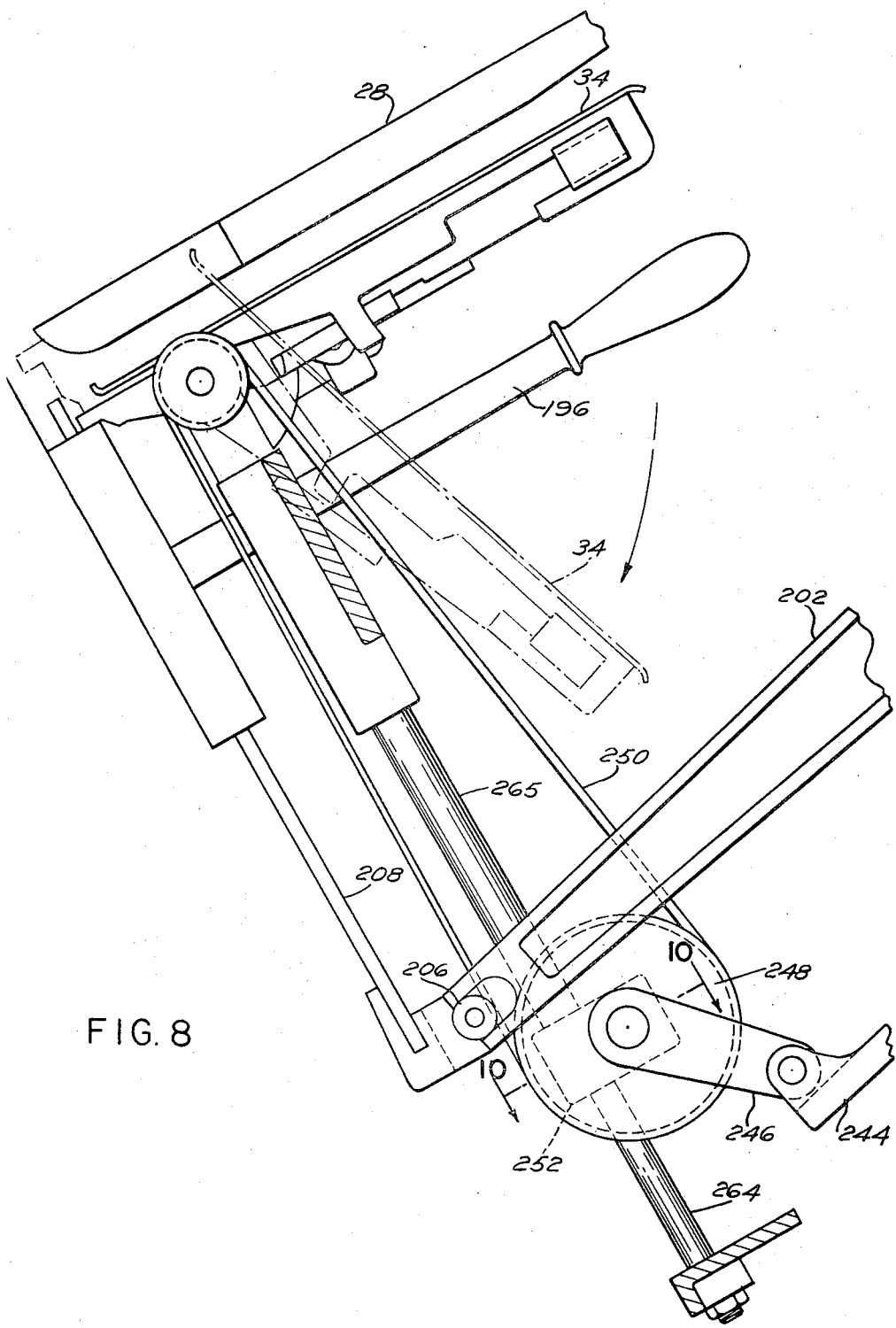
Figure 12:
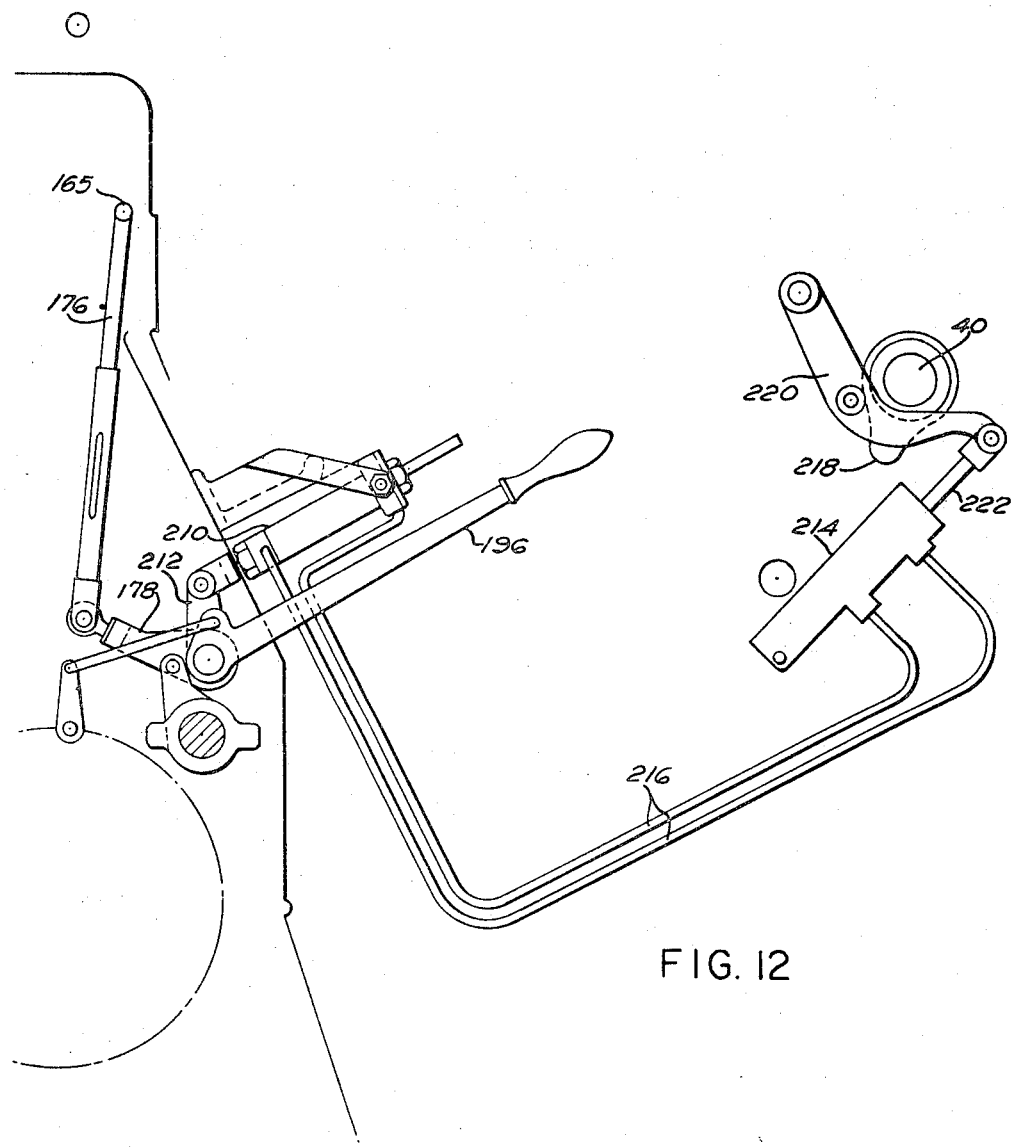
Figure 13:
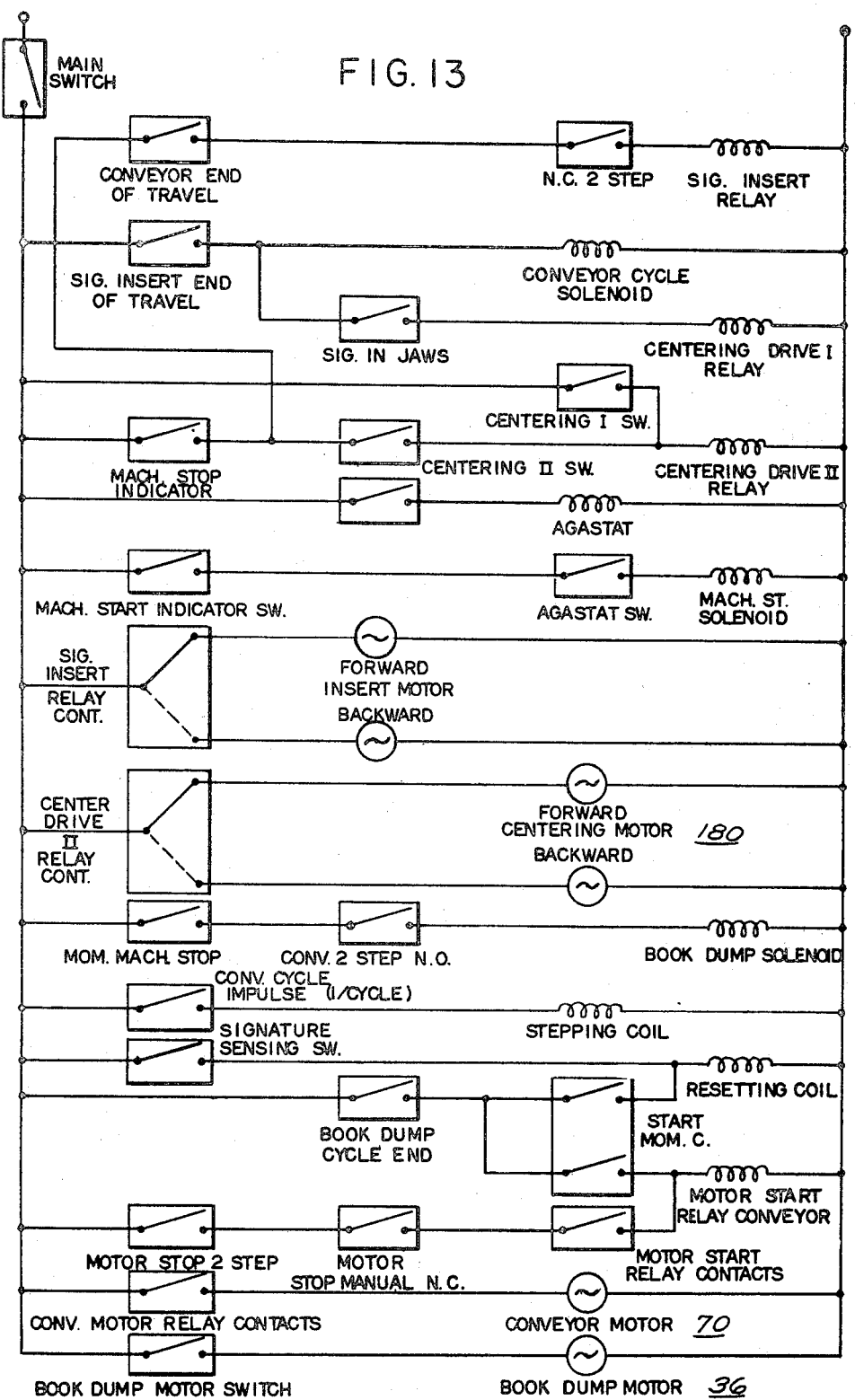

FIG. 6 is a sectional view in side elevation of the centering mechanism,

FIG. 7 is a detail side elevation of a guide arm employed in the centering mechanism, FIG. 8 is a detail view in side elevation showing the table mechanism, FIG. 9 is a detail sectional view in side elevation of the table mechanism, FIG. 10 is a cross-sectional view taken along the line 10—10 of FIG. 8, FIG. 11 is a cross-sectional view taken along the line 11—11 of FIG. 10, FIG. 12 is a view in side elevation, somewhat schematic, showing the clamp release mechanism, FIG. 13 is a schematic diagram showing the operating circuit for the attachment, and FIG. 14 is a cross-sectional view taken along the line 14—14 of FIG. 1.

Referring now to the drawings, the reference character 10 generally indicates an oversewing machine to the frame of which is connected an attachment 12 by means of a hinge 14. The attachment is generally organized about a pair of webbed side frame members 16 rigidly connected to one another as by cross rods 18 and supported on casters 20 to permit the attachment to be swung in and out of operating position, as will appear more fully below.

In general, the attachment includes an intermittently actuated belt conveyor 22 adjustably mounted on top of the frame and adapted to deliver individual signatures 24, which are placed singly thereon by the operator, down onto a signature shelf 26. From the signature shelf 26, individual signatures 24 are advanced by a pushing apparatus, shown in FIG. 3, onto a bookshelf 28 located at the front face of the oversewing machine 10.

In an opearting cycle the bookshelf 28 is adapted to reciprocate first downwardly to receive the signature delivered by the pusher mechanism. The book parts are then centered by the centering mechanism shown in FIG. 5 and the shelf then reciprocates upwardly to clamp the already sewn signatures and the newly added signature up against a transverse member 30. While held in this clamped condition, a series of spaced parallel punches and needles 32 stitch diagonally through the back edge of the new signature and into two or three adjacent, already sewn signatures, in a typical oversewing operation. The needle and punches are part of the conventional oversewing machine 10.

When the sewing operation is completed, the bookshelf 28 swings out and away from the oversewing machine 10 to drop the sewn book down onto a book table 34 located directly below the bookshelf 28. The bookshelf 28, which has swung to one side, then moves up and swings back into a closed position directly above the sewn book. The inner edge of the bookshelf is provided with a shearing blade which cuts all of the threads attached between the book and needles 32 to completely separate the book. Thereupon the table 34 swings about a horizontal axis to dump the sewn book down and out of the machine for delivery to further binding operations.

The driving mechanism for the attachment includes a motor 36 mounted near the lower portion of the frame and in driving engagement with a main drive shaft 38, which in turn drives a horizontal main cam shaft 40 through a belt 42 and pulleys 44 and 46. The main drive system includes a flexible coupling 48 and a clutch 50.

Starting with the conveyor 22, the various portions of the machine and their operation will now be described in detail. The conveyor assembly 22 is organized about a frame 52 slidably mounted on inclined tracks 54 formed in the upper portions of the main frame members 16. The position of the conveyor assembly along the tracks 54 is controlled by means of a lever 56 pivoted about a rod 58 and provided with a screw clamp 60 operated by means of a handle 62. The positioning mechanism includes a crank 64 articulated to a link 66 which is connected at 68 to the conveyor frame 52. By being able to position the conveyor assembly to a selected location along the track 54, the apparatus may be adjusted to compensate for changes in the size of the book which is being sewn.

The conveyor assembly includes a motor 70 which drives a roller 72 by means of a belt and pulley system 74.

A belt conveyor 76 is looped over the roller 72 and a smaller roller 78 to provide a flat inclined surface on which individual signatures 24 are placed by the operator. A one-revolution clutch 80, operated by a solenoid 82, is also provided so that the belt 76 will advance only in precise increments.

As best shown in FIGS. 2 and 3, spaced abutments 84 are attached transversely to the surface of the belt 76 and move with the belt. An adjustably mounted guide number 86 extends from the frame 52 over the upper surface of the belt at right angles to the abutments 84. In practice, the operator places a single signature 24 on the flat upper surface of the belt 76 with the upper edge of the signature bearing against the guide 86 and the right-hand edges, as viewed in FIG. 2, against the forward edge of an abutment 84. In this fashion, the signature is precisely positioned upon delivery onto the signature shelf 26. When the motor drives the belt forwardly, the signature is delivered down onto the signature shelf 26 with the belt advancing far enough to deliver the signature and bring another abutment into position for receiving the next signature to be placed thereon by the operator. The belt may be any length so that two or more signatures can be placed on it at one time.

Referring now more particularly to the signature shelf, indicated generally by the reference character 26, it will be noted that a shelf extends under and forwardly of the belt conveyor 22 and is mounted to the frame 52 so that the shelf 26 will move together with the conveyor 22 when the assembly is moved along the tracks 54.

The signature shelf 26 actually comprises five elongated members generally co-extensive and in spaced parallel relation to one another. The outermost of these five members are solid bars 88 of aluminum or the like, and next to them inwardly is a pair of channel members 90 which serve as tracks for pushers 92 slidably mounted therein. These pushers are adapted to engage and advance the signature from the signature shelf 26 onto the book shelf 28 where it will be sewn to other stacked and sewn signatures previously deposited. The centermost member of the signature shelf 26 is an elongated bracket 94 on the end of which is a finger 96 adapted to telescope forwardly, swing down and grip the top surface of a sewn volume to provide a vertical and backward pressure on the completed book as it is being withdrawn from the oversewing machine. Its function is primarily to clear small, thin books from the bookshelf 28 prior to the automatic trimming and dumping cycle of the machine.

The signature pushing mechanism is best shown in FIGS. 3e through 3d, where it will be seen that a pusher 92 is reciprocated along the channel member 90 by means of a flat spring tape 98 which is wound within a cylindrical housing 100 when retracted and drivingly connected to a torque arm 102 mounted fast on a shaft 104. The shaft 104 is operated by means of a torque motor which will drive the arm 102 through an arc of approximately 275° to advance the pusher 92 along the channel 90. The channel 90 will be seen in FIG. 3d to be formed with tracks 106 to accommodate the tape 98.

Each pusher 92, as best shown in FIGS. 3b, c and d, is formed with a body portion 108 formed with an angularly offset passage which accommodate a tongue 110. The tongue is held in position by a light frictional pressure applied by means of a bent leaf spring 112 or other friction type element. The purpose of the tongue 110 is to provide a seating force on the end leaf at the bottom of the first signature, which end leaf will extend beyond the width of the rest of the signatures. The tongue extending in advance of the pusher body deflects the end leaf downward so that the vertical face 114 of the pusher body 108 can push against the remaining leaves of the signature and apply pressure to insert them properly into the oversewing machine. The spring 112 only provides a frictional restraint on the backward motion of the tongue and will hold it in whatever position the action of the signatures force it. Before a new book is started, a stop 116 pushes forward within the guide track 90 to reset the tongue 110 into the position shown in full lines in FIG. 3b. Once the signature is in motion, it will be understood that a tongue is forced into the retracted position shown in dotted lines in FIG. 3b.

Referring more particularly to FIG. 3e, it will be seen that the channel members 90 each are provided with retractable stops 118 which prevent signatures fed onto the signature shelf 26 from overtraveling. The retractable stops 118 are located at the ends of the channel members 90 and are pivoted on pins 120. A flat spring 122 is employed to urge the stop 118 onto a normally lowered flush position so that the pusher can insert the signature over the end of the bars into the sewing machine 10. Operation of the stop 118 is controlled by means of a lever arm 124 which moves with the torque shaft 104. When the pusher 92 is in its rearmost or retracted position, it will be noted that the lever arm 124 has pulled back on a support 126 for the tape 98 thus raising the stop 118 to which it is connected. When the support 126 is pulled backwardly, the stop 118 is biased about its pin 120 to raise the stop into position to catch the signature. As soon as the torque arm 102 starts to rotate and thus start the advance of the pushers, the lever arm 124 is rotated also and allows the spring 122 to return the stop 118 into a lowered or flush position so that the pushers can drive the signatures forwardly over the end of the signature shelf into the oversewing machine 10.

The centermost bracket 94, as best shown in FIGS. 3, 3f, 3g and 3h, carries the finger 96, which is actuated by a cam-driven lever 128 (see FIG. 3) that is cyclically biased by a cam 130 on the main cam shaft 40. The middle bracket 94 basically comprises inner and outer channel members 132 and 134 with the inner channel adapted to telescope outwardly under the action of the lever 128. The inner channel 132 has the finger 96 hinged thereto by a pin 136 and is characterized by a curved lower edge covered by a rubber face 138. The finger 96 is normally held in the raised position as shown in full line in FIG. 3 by means of an arm 140 which has a T 142 on the end thereof. The arm is retained in a forward position by means of notches 144 and 146 formed in the lower edges of both the inner and outer channel members 132 and 134 respectively. When the inner channel member 132 is advanced forwardly by actuation of the lever 128, the notches 144 will carry the T and the arm 140 forwardly, out of engagement with the notches 146 in outer channel member. Towards the free end of the outer channel member 134 there is formed a cam 148 which, as the inner channel member approaches the end of its forward stroke, forces the arm 140 out of engagement with the notches 144 and allows the arm to return to a normally retracted right-hand position, as viewed in FIG. 3g, by means of a spring 150 one end of which is fastened to a fixed boss 152 on the outer channel and the opposite ends of which connect to a cross-piece 154 on the arm 143. When the arm 140 snaps backwards, the finger 96 is pivoted downward and as the action of the driver arm 128 brings the inner channel member 132 backwardly it will reach a point where the arm 140 meets the notch 146 on the outer channel member. Further retraction of inner channel member then causes the finger to rise back into its position in alignment with the rest of the channels and at the end to snap back into its latched position in the inner channel.

The function of the signature shelf and the pusher mechanism serves to feed signatures one by one into the oversewing machine 10. Once the signatures are fed into the machine it is necessary to center each signature so that when the signature is sewn the ends thereof will be flush with the ends of the already sewn portion of the volume. This centering function is carried out by means of the mechanism illustrated in FIGS. 5, 6 and 7. This mechanism is located on the front portion of the machine on either side of the rows of punches and needles 32 which perform the sewing operations. The centering mechanism includes two vertical guide arms 156 and 158 carried by a horizontal pinion 160. This pinion functions to raise in unison both of the guide arms 156 and 158.

Each of the guide arms is movably mounted on a traveling block 162 supported by a rail 164 of T cross-section. The rail 164 at its right-hand end, as viewed in FIG. 5, carries a pin 166 which engages a cam 165. It is the function of the cam to shift the rail incrementally from side to side to assure that stitching on adjacent signatures are not on top of one another. In other words, the rail is moved back and forth a distance of approximately ¼ inch after each sewing cycle. In practice, the rail has four positions typically ¼ inch over from the start position, over ¼ inch, back ¾ inch and over ¼ inch to the original position. The resulting stitches are then in staggered relation on the book back.

Clamped on the center of the rail 164 is a motor assembly 168 which drives a pinion 170 in mesh with a pair of racks 172 and 174. Each of the racks is connected to one of the traveling blocks 162 so that operation of the motor moves the guide arms 156 and 158 an equal distance. Lateral displacement of the rail is produced by the pin 166 riding in the cam previously mentioned and which is intermittently moved by a rod 176 shown in FIG. 12. At the end of each sewing cycle, the book shelf 28 drops preparatory to the insertion of a new signature. This movement of the bookshelf results in a rotation of an arm 178 which pulls on the rod 176 and provides an incremental rotation of the cam attached at that point on the oversewing machine 10. The results is that the motion of the rail 164 introduces a motion in the motor assembly 168 which then maintains a centering function by moving the guide arms 156 and 158 back and forth an equal distance. In practice, a torque motor 180 is employed for moving the guide arms, although various other devices may be used such as an air cylinder, for example.

In order that different sizes of signatures may be accommodated, it is necessary that the racks 172 and 174 be able to be moved a proportional distance depending upon the size of the signatures. The oscillation produced by the torquer 180 is sufficient only to open and close the guides enough to permit the centering of new signatures and therefore the centering as a whole is not sufficient of itself to accommodate a wide range of signature sizes. For this purpose a lever 182 is mounted on the motor assembly 168 and may be rotated to pivot the torque motor about a pivot pin 184 and to lift the torque motor pinion 186 out of mesh with the teeth on the top of the rack 174. With the pinion 186 thus raised, the operator may move the racks freely to a position appropriate for the particular size of the signatures that are being sewn. By returning the lever 182 to a down position, the pinion 186 will be re-engaged to provide a proper amount of incremental motion of the centering guide arms 156 and 158 in the new overall width configuration for the signatures.

It should be understood that the lower ends of the guides arms 156 and 158 rest on the top of the bookshelf 28 and move up and down with it. As best shown in FIG. 7, springs 188 are employed to urge the guide arms down against the bookshelf. In order to keep the guide arms from dropping below the plane of the bookshelf when it is swung out and away from the oversewing machine, a feeler or rack arm 190 is mounted slideably in a fixed bracket 192 and meshes with the pinion 160 which is also in mesh with teeth 194 formed in the front faces of the guide arms 156 and 158. The lower end of the feeler arm 190 also bears against the top surface of the bookshelf 28 but in such a position that it does not move out of engagement with the bookshelf even when the bookshelf has swung outwardly. In this fashion, the feeler arm always keeps the lower edges of the guide arms in the same place as the bookshelf. Otherwise, the guide arms would be damaged by the bookshelf when it swings back into a closed position.

When the final signature has been double sewn in place, the unloading cycle is started either automatically or manually. The first part of the dumping cycle involves the release of the clamp handle 196 and the dropping of the bookshelf 28 approximately 1 inch from its final sewing position. This is done to make sure that the fingers projecting from the bookshelf are clear of those fingers on the signature shelf 26. Once the 1 inch drop has occurred, the bookshelf 28, which is hinged to and rises up and down along a rod 197, is swung out and away from the sewing machine allowing the sewn volume to fall onto the book table 34 below. The bookshelf then rises while still in an open position to a level just under the signature shelf 26. The bookshelf then swings closed while the book table rises slightly so that the threads on the sewn book will be cut to a minimum length as the bookshelf closes. After the bookshelf is closed, it rises to a starting position. The book table 34 is then tipped down to allow the sewn book to fall into a chute or conveyor for delivery to the next covering operation.

The bookshelf is spring loaded or counter weighted so that when it is released it will rise to its top or starting position.

Referring now more particularly to FIG. 1, the operation of the main drive shaft 38 and the main cam shaft 40 are governed by clutches. The machine is designed so that one revolution of the main cam shaft 40 performs all of the necessary functions in the unloading cycle. As the main cam shaft 40 starts turning it actuates a cam release lever 198 (FIG. 3). This releases a wrap spring clutch 200 and locks a bookshelf actuating arm 202 (FIGS. 3 and 8) to driving link 204. The arm 202 is connected to to the bookshelf 28 through a roller fitting 206 (FIG. 8) which is bolted to friction bars 208 on the oversewing machine 10.

Until the clutch 200 is engaged, the arm 202 is free to follow the position of the bookshelf 28. When the arm becomes locked, the friction lever 196 of the oversewing machine may be released. The releasing mechanism for the friction lever 196 is shown in FIG. 12 and includes hydraulic cylinder 210 mounted above the friction lever 196 and drivingly connected to it by means of a link 212. The cylinder 210 is actuated by a pump 214 connected to it by flexible conduits 216. The pump 214 in turn is controlled by means of a rotation of the mean cam shaft 40 which through a cam lobe 218 moves an arm 220 to drive a piston rod 222 into the pump 214 and thereby actuate the hydraulic cylinder 210 to rotate the lever 196 and release the bookshelf 28. Once the friction pressure on the bookshelf is released the control of the bookshelf is transferred entirely to the arm 202 and the link 204.

As previously indicated, the bookshelf 28 is spring mounted and normally urged in an upward direction so that the only restraint applied to the bookshelf is through the main cam shaft 40. The next movement of the main cam shaft causes a 1 inch downward travel on the end of the arm 202 to drop the bookshelf. This motion is supplied primarily to insure that the bookshelf clears the signature shelf 26 when thin volumes are being sewn. With the bookshelf in the lowered position, it now may be swung out and away into an open position.

The opening operation is carried out by means of the clutch 50 engaging for ½ a revolution. This clutch is best shown in FIG. 13 where it will be seen that the clutch body 51 is provided with double lobes adapted to engage a latch 224 which is moved into and out of engagement with the clutch by a pivotally mounted arm 226 carrying a cam follower 228 which rides against a cam 230 carried on the main cam shaft 40. Each time the latch is released, the clutch makes a ½ revolution. The first half of the cycle swings an arm 226 (FIG. 2) towards the oversewing machine. This arm is moved by means of a crank 228 and a link 230 mounted on the upper end of the drive shaft 38. The arm 226 carries an elongated pin 232 which engages with an arm 234. The arm 234 in turn is connected to a finger 236 attached to the edge of the bookshelf 28.

The pin 232 is made elongated so that the arm 234 may ride up and down, together with the bookshelf 28, without moving out of engagement with the pin. As shown in FIG. 2, the arm 234 is formed with a hook-like portion 238 so that the arm may be disengaged from the pin when the entire attachment 12 is swung out of operating position on its casters 20. For this same reason, the hydraulic conduits 216 of FIG. 12 are flexible to permit convenient movement of the attachment 12 from the sewing machine 10. In any event, when the bookshelf is open, it is at 90° from its normal closed position, and the book is allowed to drop onto the table 34.

It will be understod that the entire bookshelf is not hinged for swinging movement but rather a narrow portion adjacent the sewing machine remains in its normal position. Since there is a possibility that a thin, light book might not fall away from the narrow remaining portion of the bookshelf, means are provided to insure that the book is pulled away from the oversewing machine for a distance of about 1 inch or so both by the motion of the table 34 and the actuation of the finger 96 referred to in FIGS. 3, 3f, 3g and 3h. These functions of the book table 34 are controlled by rotation of the main cam shaft 40 through a linkage system which includes an arm 240 pivoted about a rod 242 and carrying an articulated link 244, the end of which is pivotally connected to a crank 246. The crank in turn rotates a pulley 248 for a timing belt 250 and applies locking pressure on a brake 252, detailed in FIGS. 10 and 11. As shown in FIGS. 10 and 11, the brake comprises a clamping block 254, carrying a shaft 256 having an eccentric cutout so that its initial rotation will force a block against a spring 260, forcing a brake shoe 262 against a fixed shaft 264 which serves as a guide for the book table 34. The book table 34 is slideably connected to the shaft 264 by means of tubes 265 telescoped over the shafts and having upper ends secured to table brackets 266. The book table 34 is spring loaded to slide upward along the shafts and, during normal cycling, is maintained at a controlled distance below the bookshelf 28 by means of a stop 268 attached to the bookshelf.

Once the crank 246 is rotated the application of the brake 252 locks the book table 34 on the shaft 264 which is secured to the main frame of the machine so that it will not lift when the bookshelf is raised but will rise only to meet the bookshelf when the brake is released by the return motion of the link 244. Rotation of the crank 246 provides rotation of the pulley 248 which drives a shaft 270 and moves a table insert 272 by rotation of an eccentric 274 to provide a lifting and upward force on the underside of the book. Simultaneously, the finger 96 on the signature shelf 26 extends outwardly and pivots down so that its rubber face clamps against the top of the book. This finger then, in a single stroke, retracts to pull the book entirely off of that portion of the bookshelf 28 that is not swung out of position. As previously mentioned, the operation of the finger 96 is controlled by means of the lever 128 shown in FIG. 3.

At this point in the cycle, the lever 198 (FIG. 3) releases the clutch 200 and the open bookshelf 28 is allowed to rise until it hits a stop just below the level of the signature shelf 26. The clutch 50 (FIGS. 1 and 13) is released again and the arm 226 (FIG. 2) is cranked back to its starting position thus closing the bookshelf 28 and thereby also trimming the threads on the top of the newly sewn book. As the closing cycle is concluded, further rotation of a pulley 276, driven by the timing belt 250, brings a roller 278 to press against a stop 280 on the underside of the table 34 to drive the table forwardly as the rotation continues. A set of fingers 282 attached to the table 34 drags a latch bar 284 forwardly, releasing it from contact with the support bracket 266 and therefore allowing the book table to pivot around the curved face of the bracket and to dump the book.

The link 244 is then returned to its starting position through rotation of the main cam shaft and a spring 286 returns the book table to the up position. When the table has returned to its starting position, the brake 252 is released and the book table rises to engage again with the stop 266 on the underside of the bookshelf to complete a full cycle of operation.

A schematic circuit diagram for the apparatus is shown in FIG. 3. The circuit consists primarily of a relay system arranged so that the machine will operate in the proper sequence to provide the needed double stitching for the two end-leaf sections. This last mentioned function is carried out by means of a two-step relay which will dwell the feeding mechanism and cause the sewing mechanism to cycle twice in order to double stitch the first and last signatures fed into the machine for each book. The various relays and actuating switches are located at selected points in the machine to sense the position of the signatures of the book as they pass through the machine and to actuate each successive drive mechanism in its proper sequence.

While the attachment has been described with particular reference to the illustrated embodiment, it will be understood that numerous modifications thereto will appear to those skilled in the art. Also, it will be understood that the above description and accompanying drawings should be taken as illustrative of the invention and not in a limiting sense.

What is claimed is:

1. Apparatus for centering a stack of signatures on a shelf having first and second portions and adapted to drop incrementally with the addition of a new signature on the top thereof, comprising a pair of horizontally disposed racks mounted in spaced parallel relation, a first pinion in mesh with both of said racks, power means for oscillating said first pinion to reciprocate said racks, a generally upright guide arm slidably mounted to the outer end of each of said racks, each of said arms being formed with gear teeth, the lower end of each arm resting on the first portion of said shelf in one shelf position and out of engagement therewith in a second position of said first shelf portion, an elongated second pinion gear rotatably mounted in spaced parallel relation to said racks and in mesh with the gear teeth of said guide arms and a feeler arm mounted to said second pinion in spaced parallel relation to said guide arms and having gear teeth in mesh with said second pinion, the lower end of said feeler arm resting at all times on said second portion of said shelf and adapted to prevent movement of said arms when said arms are out of engagement with the first portion of said shelf.

2. Apparatus according to claim 1 including means for temporarily disengaging said power means to permit manual spacing of said guide arms.

3. Apparatus according to claim 1 including means for cyclically shifting said racks and guide arms back and forth in incremental steps.

4. Apparatus for centering a stack of signatures or the like on a supporting surface, comprising a pair of horizontally disposed racks mounted in parallel relation, a pinion in mesh with both of said racks, power means for oscillating said pinion to reciprocate said racks in opposite directions, a generally upright guide arm mounted to each of said racks for engaging the sides of said stack and centering individual signatures thereon and means for cyclically lowering said arms with respect to said rack.

5. Apparatus according to claim 4 including means for laterally shifting said arms and said stack back and forth in predetermined increments.

6. Apparatus for centering a stack of signatures or the like, on a shelf adapted to drop incrementally with the addition of a new signature on the top thereof, comprising a pair of horizontally disposed racks mounted in spaced parallel relation, a first pinion in mesh with both of said racks, power means for oscillating said first pinion to longitudinally reciprocate said racks, a generally upright guide arm mounted to each of said racks, each of said arms being formed with gear teeth, an elongated second pinion gear rotatably mounted in spaced parallel relation to said racks and in mesh with the gear teeth of said guide arms and the lower end of at least one of said guide arms resting on said shelf and adapted to move said guide arms in response to movement of said shelf.

7. Apparatus according to claim 6 including spring means engaging said guide arms and urging them down against said shelf.

References Cited

UNITED STATES PATENTS

| | | | |
|---|---|---|---|
| 726,435 | 4/1903 | Kaup | 214—6 |
| 2,886,190 | 5/1959 | Beaulieu et al. | 214—6 |

ROBERT G. SHERIDAN, *Primary Examiner.*

R. J. SPAR, *Assistant Examiner.*